UNITED STATES PATENT OFFICE.

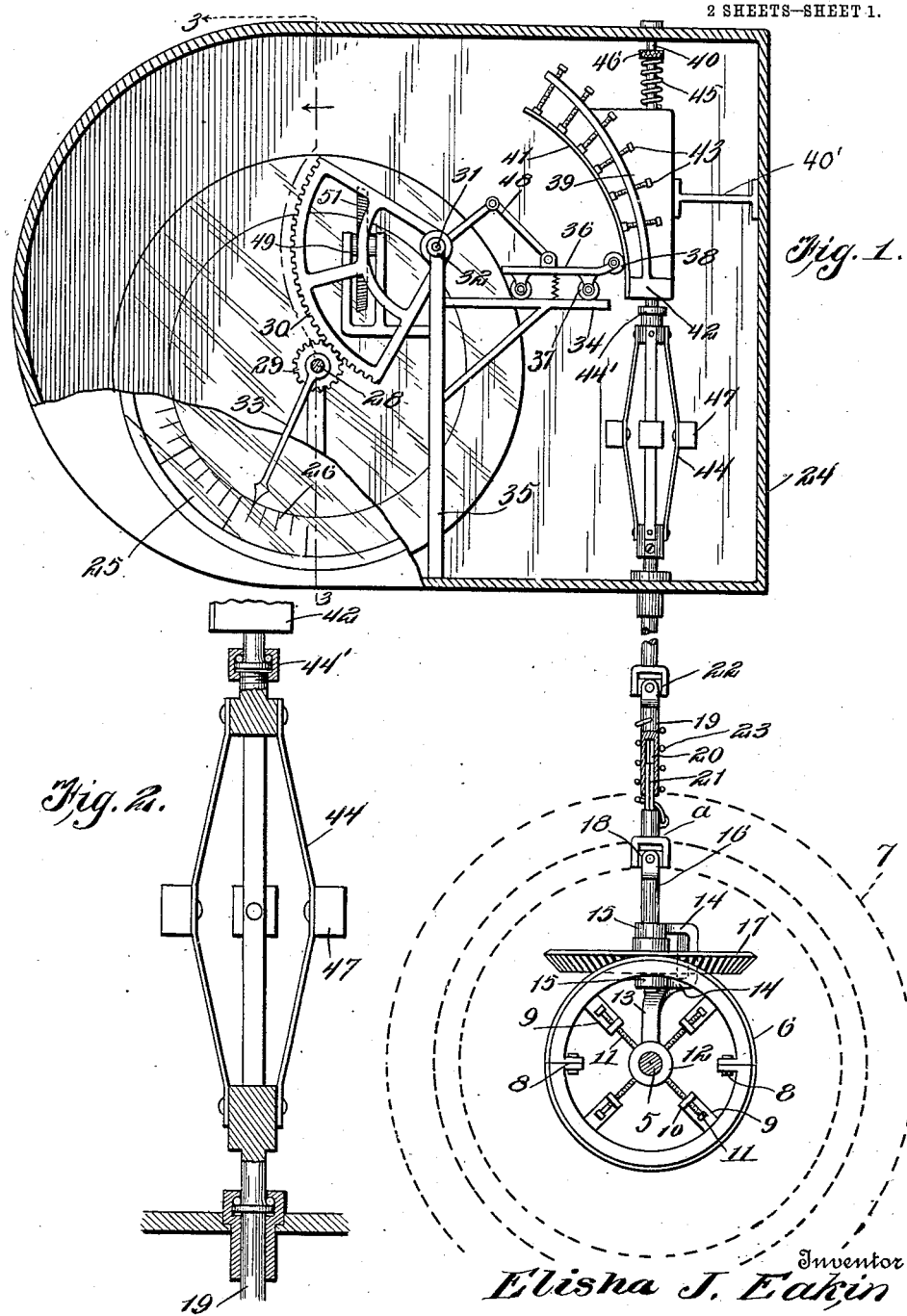

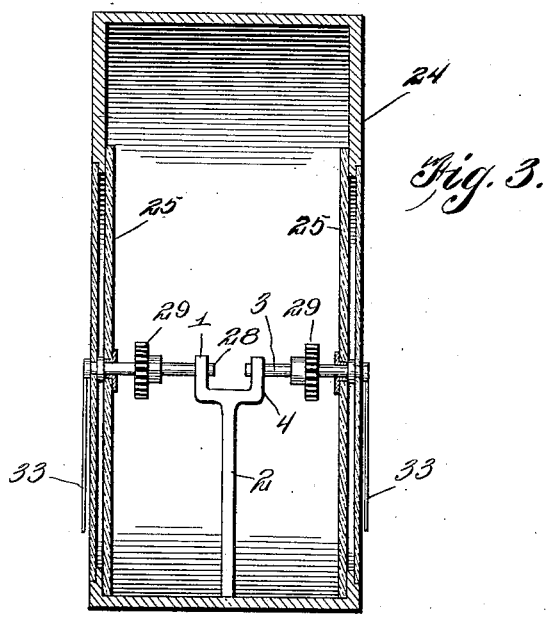
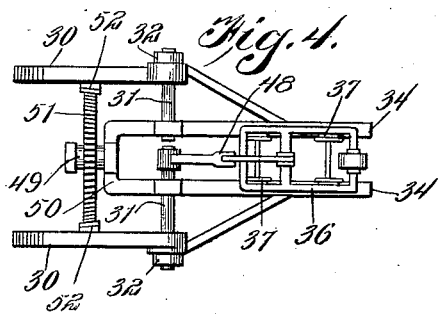

ELISHA J. EAKIN, OF ESTES, MISSISSIPPI.

SPEEDOMETER.

1,049,063.  Specification of Letters Patent.  Patented Dec. 31, 1912.

Application filed October 21, 1911. Serial No. 655,949.

*To all whom it may concern:*

Be it known that I, ELISHA J. EAKIN, a citizen of the United States, residing at Estes, in the county of Winston and State of Mississippi, have invented new and useful Improvements in Speedometers, of which the following is a specification.

The general object of the invention is to improve, simplify and reduce the cost of speedometers such as are used with motor vehicles.

Other objects will appear and be better understood from the following description taken in connection with the accompanying drawings, in which, Figure 1 is a side elevation of the device also showing a sufficient portion of a motor vehicle, to illustrate one application of my invention thereto. Fig. 2 is a detail partly in section of the transmission shaft and governor. Fig. 3 is a section through the head or casing taken approximately on the line 3—3 of Fig. 1. Fig. 4 is a detail top plan view of a portion of the dial operating mechanism.

5 indicates the front axle and 6 a beveled gear wheel connected in any preferred manner to the hub of the front wheel 7. The wheel 6 is preferably formed with sections bolted together as shown at 8 and has inwardly extending radial arms 9 with offsets 10 which take screws 11 which are connected to the hub 12 of the front wheel.

13 indicates a bracket, connected to the axle 5 and having forked arms 14, 14 portions of which extend horizontally and have bearings 15, 15 for the lower section 16 of the transmission shaft $a$ to which is fixed the beveled gear 17 which meshes with the beveled gear 6.

18 indicates a universal joint in the lower shaft section 16, and 19 indicates the upper shaft section which has a cylindrical bore 20 in which slidingly fits the non-cylindrical portion 21 of the lower shaft section 16.

22 indicates a universal joint in the upper shaft section 19, and 23 a retractile spring which connects the upper and lower shaft sections and turns therewith. By the provision of the universal joints 18 and 22 an element of flexibility is imparted to the transmission shaft $a$ in order to compensate for lateral movement of the vehicle body with respect to the axle 5, and the sliding connection between the upper and lower sections 16 and 19 compensates for vertical springing movement of the vehicle body.

The casing 24 is adapted to be secured to any convenient portion of the vehicle body such as the dash-board, so that at least one of the sides of the casing, which comprise the dial 25, will be visible to the driver. The opposite side of the casing may be viewed from the exterior of the vehicle. The dials are of glass and the scale 26 on each dial, has the figures thereof in black or some other dark color, and the surface of each dial with the exception of the portions covered by the figures, is ground or opaque. A suitable incandescent lamp (not shown) may be arranged in the casing for the purpose of illuminating the dials at night.

28 indicates an arbor journaled in one of the prongs 1 of a forked arm 2, and in one side of the casing 24.

3 is a second arbor journaled in the prong 4 and opposite side of the casing 24.

29, 29 are pinions secured to the arbors 28 and 3 and which mesh with toothed sectors 30, 30 secured to shafts 31—31 journaled in bearings 32—32.

33—33 indicate the pointers which turn with the arbors 28 and 3, and 34—34 indicate the rails of a track supported in the casing 24 by means of uprights 35—35 formed with the bearings 32—32.

36 indicates a car body provided with flanged wheels 37 which travel on the rails 34, 34 and 38 indicates a bearing roller connected to the frame 36, but offset therefrom and bearing on a cam 39 which slides on a spindle 40 in the casing 24. A horizontal guide bracket 40′ is secured to the casing 24 and bears against the adjacent side of the cam 39 to prevent lateral movement thereof. The face 41 of the cam 39 is preferably of a single piece of resilient metal connected at one end to a block 42 and adjusted by a series of set screws 43. The set screws 43 increase in length as the outer end portion of the cam is approached so that by turning the set screws into the position shown in the drawings, the face of the cam will be rendered concave so that its entire surface will contact with the bearing roller 38 as the cam slides on the spindle 40.

44 indicates the centrifugal governor which is secured to the upper shaft section 19 and connected by a swivel 44′ to the cam 39.

45 indicates a retractile spring surrounding the spindle 40 and adjusted by means of a nut 46 screwed onto the spindle 40. When the hand nut 46 is turned so as to adjust the spring 45 this will also have the effect of adjusting the governor 44.

In operation, and when the transmission shaft $a$ is turned by the rotation of the front wheel 7, the weights 47 of the governor will move outwardly by centrifugal force, whereby, the governor will be contracted as to length, thus drawing the cam 39 downwardly on the spindle 40, whereby, the car will be moved inwardly by the cam. Referring now to the drawings, it will be seen that one of the arbors 31 is connected to the frame of the car by means of the toggle 48 so that as the car moves inwardly, the toggle will turn the arbor and one of the sectors secured thereto. 49 is a stub shaft on the cross piece 50 connecting the rails 34—34, and 51 is a gear wheel which meshes with arcuate-shaped racks 52—52 on the sectors 30—30. Now, if the movement of the sector as just described, turns the indicator hand connected to the arbor 28 in a clockwise direction, then the opposite indicator hand connected to the arbor 3 will, through the gear connections 51 and 52, be turned contra-clockwise with respect to the first-named indicator hand, but clockwise with respect to the scale on the adjacent dial.

Although I have shown and described one embodiment of my invention it is to be understood that I am not to be limited to the specific arrangement and construction of parts since various changes may be made, within the scope of the appended claims without departing from the spirit or sacrificing any of the advantages of the invention.

What I claim as new is:

1. In a speedometer, the combination with a casing, of a dial having a scale and secured to said casing, an arbor journaled in the casing and having a toothed wheel, uprights mounted in said casing, a tooth sector pivoted in said uprights and meshing with the toothed wheel, a track carried by said uprights, a reciprocating element for turning said sector and mounted upon said track, means for reciprocating said element, and means for operating the last named means.

2. In a speedometer, the combination with a casing; of a dial having a scale and secured to the casing, an arbor journaled in the casing and having a toothed wheel, a toothed sector meshing with the toothed wheel, a reciprocating element for turning the sector, a cam having an adjustable face for reciprocating the said element, and mechanism including a centrifugal governor for operating the cam.

In testimony whereof I affix my signature in presence of two witnesses.

ELISHA J. EAKIN.

Witnesses:
 ARCHIE P. HULL,
 JESSE L. McCRACKEN.

---

Copies of this patent may be obtained for five cents each, by addressing the "Commissioner of Patents Washington, D. C."